United States Patent
Powers et al.

(10) Patent No.: US 11,010,472 B1
(45) Date of Patent: May 18, 2021

(54) SYSTEMS AND METHODS FOR SIGNATURE-LESS ENDPOINT PROTECTION AGAINST ZERO-DAY MALWARE ATTACKS

(71) Applicant: ARCHITECTURE TECHNOLOGY CORPORATION, Eden Prairie, MN (US)

(72) Inventors: Judson Powers, Ithaca, NY (US); Katey Huddleston, Ithaca, NY (US)

(73) Assignee: Architecture Technology Corporation, Eden Prairie, MN (US)

( * ) Notice: Subject to any disclaimer, the term of this patent is extended or adjusted under 35 U.S.C. 154(b) by 161 days.

(21) Appl. No.: 16/168,722

(22) Filed: Oct. 23, 2018

(51) Int. Cl.

| | |
|---|---|
| G06F 21/56 | (2013.01) |
| H04L 29/06 | (2006.01) |
| G06F 9/455 | (2018.01) |
| G06K 9/62 | (2006.01) |
| G06N 20/00 | (2019.01) |

(52) U.S. Cl.
CPC ........ *G06F 21/566* (2013.01); *G06F 9/45558* (2013.01); *G06K 9/6282* (2013.01); *G06N 20/00* (2019.01); *H04L 63/1416* (2013.01); *G06F 2009/45591* (2013.01)

(58) Field of Classification Search
CPC .............. G06F 21/566; G06F 9/45558; G06F 2009/45591; G06F 21/56; G06F 9/455; G06F 15/18; G06N 20/00; H04L 63/1416; H04L 29/06; G06K 9/6282; G06K 9/62
See application file for complete search history.

(56) References Cited

U.S. PATENT DOCUMENTS

| | | | |
|---|---|---|---|
| 10,642,753 B1 * | 5/2020 | Steinberg | .............. G06F 12/109 |
| 2011/0314542 A1 * | 12/2011 | Viswanathan | .... H04W 12/1208 |
| | | | 726/23 |
| 2018/0004937 A1 * | 1/2018 | Shannon | ................. G06F 21/51 |

(Continued)

OTHER PUBLICATIONS

Katey Huddleston, ATC-NY, AF173-002, F173-003-0030, AMISS document, Title: Endpoint Protection for Zero Day Prevention, Architecture Technology Corporation, published Oct. 25, 2017, 23 pages.

*Primary Examiner* — Ashokkumar B Patel
*Assistant Examiner* — Quazi Farooqui
(74) *Attorney, Agent, or Firm* — Foley & Lardner LLP

(57) ABSTRACT

Disclosed herein are embodiments of systems, methods, and products providing real-time anti-malware detection and protection. The computer uses artificial intelligence techniques to learn and detect new exploits in real time and protect the full system from harm. The computer trains a first machine learning model for executable files. The computer trains a second machine learning model for non-executable files. The computer trains a third machine learning model for network traffic. The computer identifies malware using the various machine learning models. The computer restores to a clean, uncorrupted state using virtual machine technology. The computer reports the detected malware to a security server, such as security information and even management (SIEM) systems, by transmitting detection alert message regarding the malware. The computer interacts with an administrative system over an isolated control network to allow the system administrator to correct the corruption caused by the malware.

18 Claims, 3 Drawing Sheets

(56) References Cited

U.S. PATENT DOCUMENTS

| | | | |
|---|---|---|---|
| 2018/0018590 A1* | 1/2018 | Szeto | G06F 21/6254 |
| 2018/0075239 A1* | 3/2018 | Boutnaru | G06F 21/60 |
| 2019/0058736 A1* | 2/2019 | Stupak | G06F 21/55 |
| 2019/0215697 A1* | 7/2019 | Lee | H04W 12/1208 |
| 2019/0294791 A1* | 9/2019 | Saldanha | G06F 11/3624 |
| 2019/0347413 A1* | 11/2019 | Dubrovsky | G06F 21/53 |
| 2020/0117187 A1* | 4/2020 | Kothari | G08G 1/166 |

* cited by examiner

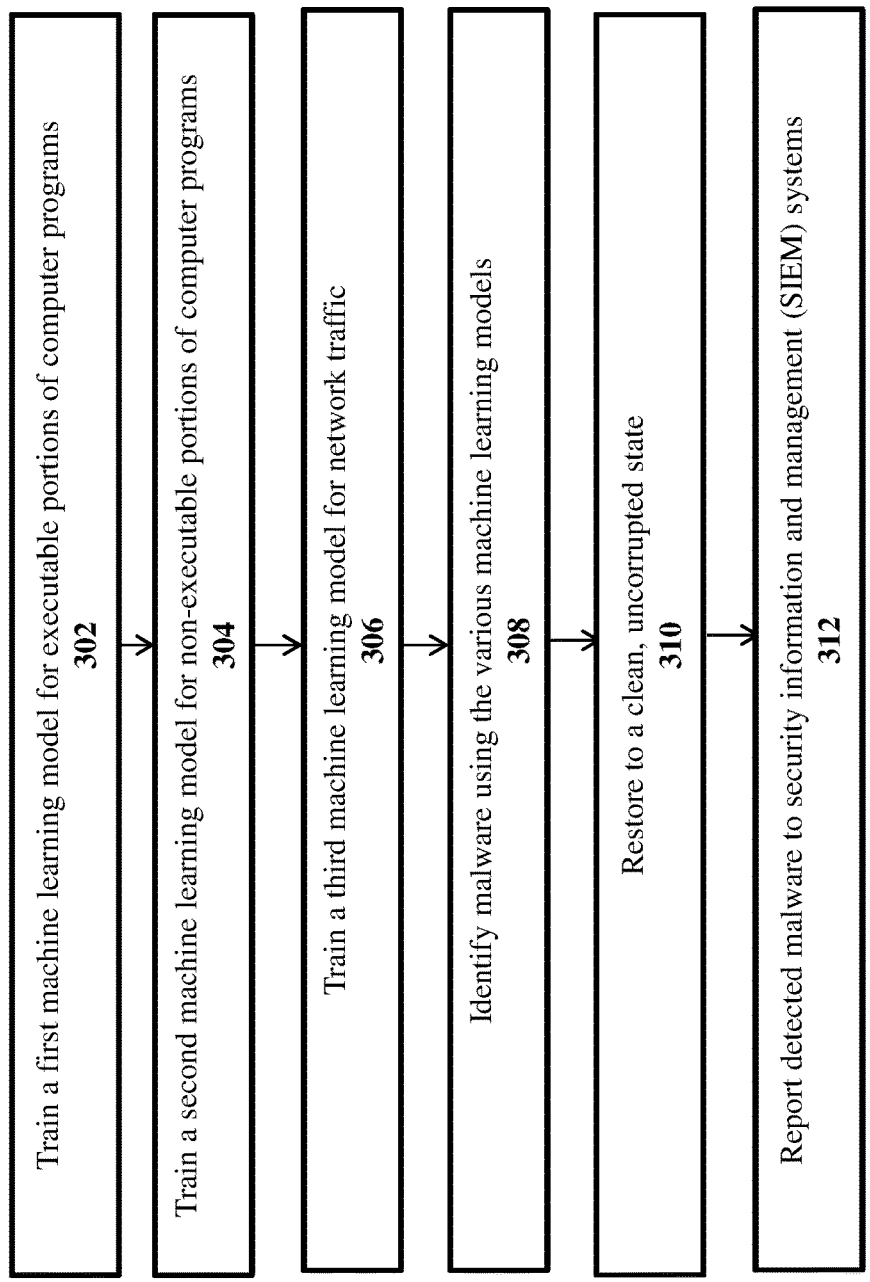

SYSTEMS AND METHODS FOR SIGNATURE-LESS ENDPOINT PROTECTION AGAINST ZERO-DAY MALWARE ATTACKS

TECHNICAL FIELD

This application relates generally to methods and systems for signature-less real-time anti-malware detection and protection.

BACKGROUND

Malware is a constant threat in the modern-day computing landscape: every computer connected to a network is under threat of infection. Infected computers are equally less useful and dangerous to both individuals and organizations. Systems may be damaged, making them slower, deleting information, or rendering them completely nonfunctional. Dangerously, valuable information may be stolen and used. Worse yet, infected systems may continue to spread virus to others either inside or outside of their network.

Zero-day exploits, or malware that takes advantage of an unknown vulnerability in a system, can be even more fatal than the typical malicious program. Zero-day exploits or malware are unpredictable, new, and different in almost every sense, because there is no available knowledge on what vulnerabilities the program targets or when malware developers may find such vulnerabilities.

Conventional anti-malware software may aim at detecting malware via signatures, or finding patterns within programs that are associated with other known malware. Conventional methods of anti-malware may work on a signature-based detection system, which compares executables and data to patterns of known malware with good accuracy. Zero-day exploits may not fit any pattern of known malware by nature. Consequently, conventional anti-malware software may fail to find zero-day exploits. Conventional approaches may have very low accuracy for new malware and exploits, such as zero-day attacks, which are unpredictably different from known malware. However, zero-day exploits are becoming increasingly common and are increasingly used to attack specific, more secure systems that cannot otherwise be breached.

Thus, there is a need for tools that can accurately detect malware without use of signature, but rather by analysis of the unanimous consequences of all malwares on infected systems to detect and protect against zero-day exploits.

SUMMARY

What is therefore desired is to have a system that autonomously detects and prevents zero-day and other exploits in real time with a signature-less self-learning system from different sources (mail servers, boundary devices and other hosts). Embodiments disclosed herein solve the aforementioned problems and other problems by providing a signature-less anti-malware application (commercially known as anti-malware intelligent system supervisor (AMISS)). Specifically, a computer running the anti-malware application may use artificial intelligence techniques to learn and detect new exploits in real time and protect the full system from harm. The computer may train a first machine learning model for executable files. The computer may train a second machine learning model for non-executable files. The computer may train a third machine learning model for network traffic. The computer may identify malware using the various machine learning models. The computer may restore to a clean, uncorrupted state using virtual machine technology. The computer may report the detected malware to a security server, such as security information and even management (SIEM) systems, by transmitting detection alert message regarding the detected malware. The computer may interact with an administrative system over an isolated control network to allow the system administrator to correct the corruption caused by the malware.

In order to learn the distinctive properties of malware, the computer may employ an intelligent learning of non-malicious software behaviors (typical user actions), legitimate versus illegitimate data flow, and suspicious behaviors. In order to protect the host computer and the software from corruption, a separation of the endpoint system from known uncorrupted states may allow that the host computer and the software may be restored in the event of corruption from hazardous files. In addition, the computer may be able to detect malicious code based on machine learning methods of different properties of malware and enable categorization between the malicious and benign behaviors. The computer may protect the system, communicate with existing host systems, and enable system managers (e.g., system administrator) to act on the attempted breach. While the computer is working silently in the backgrounds defending against malicious executables, non-executable data, and network traffic, the computer may be performing other tasks in parallel.

In one embodiment, a computer implemented method comprises training, by a computer, a first machine learning model for detecting malicious inputs based on a dataset of executable portions of a plurality of computer program files by applying static analysis and dynamic analysis using binary instrumentation techniques, wherein the binary instrumentation techniques comprise analyzing behavior of the plurality of computer program files at runtime through injection of an instrumentation code; training, by the computer, a second machine learning model detecting malicious inputs based on a dataset of non-executable portions of the plurality of computer program files by applying the static analysis and the dynamic analysis using the binary instrumentation techniques; and identifying, by the computer, a malicious portion within an input file using the first and second machine learning models.

In another embodiment, a system comprises a security server, a computer in communication with the security server and configured to: executable portions of a plurality of computer program files by applying static analysis and dynamic analysis using binary instrumentation techniques, wherein the binary instrumentation techniques comprise analyzing behavior of the plurality of computer program files at runtime through injection of an instrumentation code; train a second machine learning model detecting malicious inputs based on a dataset of non-executable portions of the plurality of computer program files by applying the static analysis and the dynamic analysis using the binary instrumentation techniques; and identify a malicious portion within an input file using the first and second machine learning models.

It is to be understood that both the foregoing general description and the following detailed description are exemplary and explanatory and are intended to provide further explanation of the disclosed embodiments and subject matter as claimed.

BRIEF DESCRIPTION OF THE DRAWINGS

The accompanying drawings constitute a part of this specification and illustrate embodiments of the subject matter disclosed herein.

FIG. 3 illustrates a flowchart for signature-less real-time anti-malware detection and protection, according to an embodiment.

DETAILED DESCRIPTION

Figure 1:
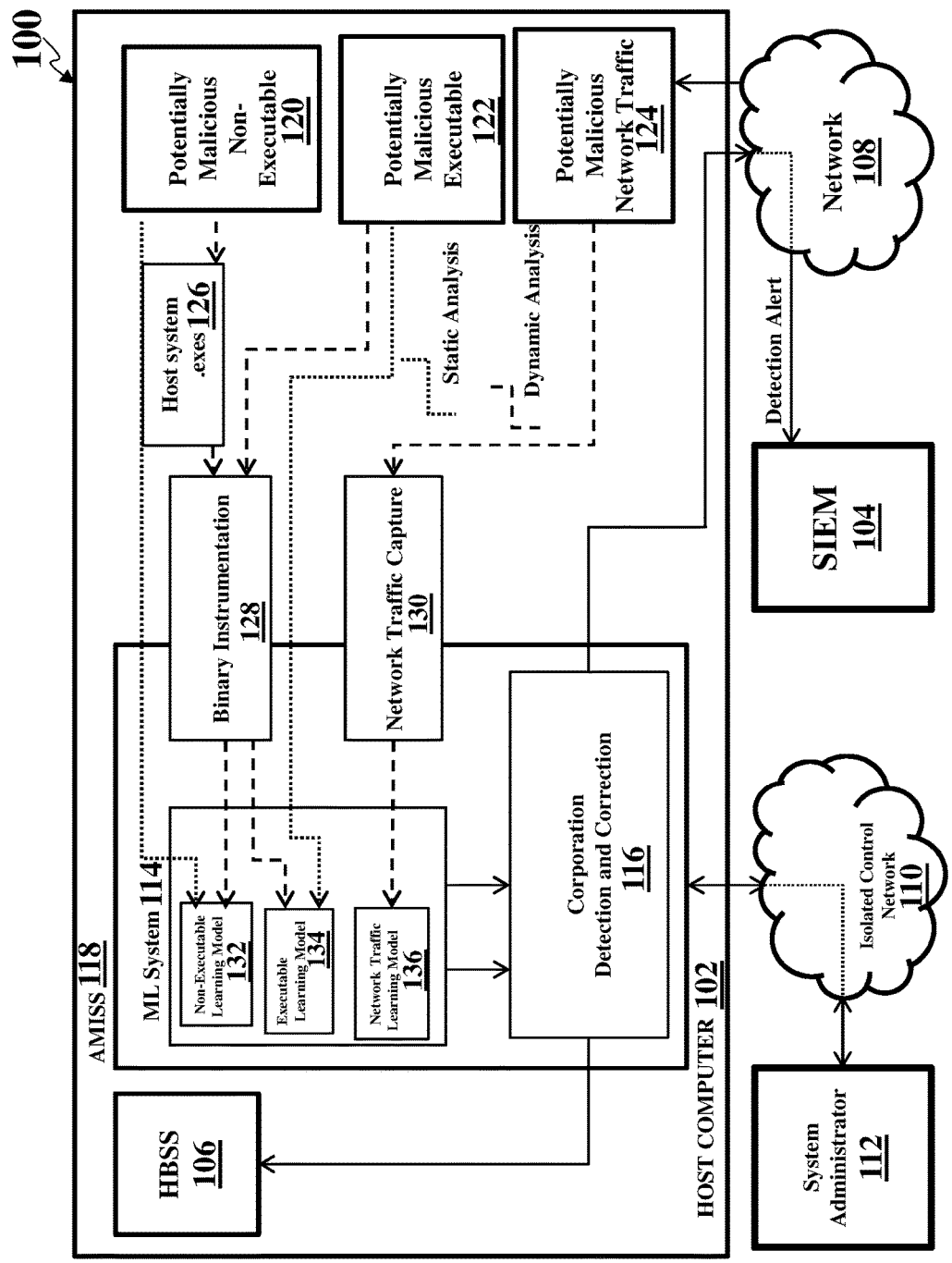
FIG. 1 illustrates a computer system for real-time anti-malware detection and protection, according to an embodiment.

Reference will now be made to the illustrative embodiments illustrated in the drawings, and specific language will be used here to describe the same. It will nevertheless be understood that no limitation of the scope of the claims or this disclosure is thereby intended. Alterations and further modifications of the inventive features illustrated herein, and additional applications of the principles of the subject matter illustrated herein, which would occur to one ordinarily skilled in the relevant art and having possession of this disclosure, are to be considered within the scope of the subject matter disclosed herein. The present disclosure is here described in detail with reference to embodiments illustrated in the drawings, which form a part here. Other embodiments may be used and/or other changes may be made without departing from the spirit or scope of the present disclosure. The illustrative embodiments described in the detailed description are not meant to be limiting of the subject matter presented here.

To address the current lack of protection from zero-day malware, embodiments disclosed herein describe a computer that builds a signature-less anti-malware intelligent system supervisor that is capable of real-time detection of and protection from zero-day exploits. The computer may analyze all static non-executables or interpreted documents and scripts in documents, PDFs (portable document format), bash scripts, PowerShell scripts, etc. The computer may interact and report findings to existing SIEM (security information and event management) with a short period of time (e.g., 45 minutes). When the computer detects malicious activity, the computer may notify any existing SIEM systems and host-based agents of the attempted malicious activity. The computer may be able to integrate with host intrusion protection systems and/or host based security systems. The computer may be capable of running in an autonomous fashion if connectivity to a server is interrupted. The computer may have a high degree of fault tolerance and reliability during abnormal host events and/or disconnection. If failure occurs, the computer may fall into known safe state. The computer may be able to perform a static analysis of malware executables while minimizing the degradation of the host performance. The computer may provide the capability to inject customized instruction checks and perform behavior analysis on web requests and network traffic. The computer may notify all other host-based agents of newly discovered malware threats. The computer may have the capability to detect malicious activities that have not been previously detected regardless of network connectivity. The computer may be able to protect itself if there is unauthorized manipulation/control of the host. The computer may provide the support of an out-of-band connection. The computer may provide support including but not limited to bi-directional authentication, authorization and accounting that is secured via an encrypted command, control and data channel, and virtual LANs (local area networks). The computer may be interoperable with virtualized environments.

FIG. 1 illustrates a computer system 100 for real-time anti-malware detection and protection, according to an embodiment. A computer or host computer 102 may perform signature-less real-time anti-malware detection and protection. More specifically, the computer may use machine learning models to detect malware based on data acquired through both static and dynamic analysis of executables, non-executable data, and network traffic. The computer 102 may integrate with other cyber defense components, including SIEM systems 104 and endpoint protection software, such as host based security system (HBSS) 106. The computer 102 may be any computing device comprising a processor and capable of performing various tasks and processes described herein.

The computer 102 may comprise a machine learning system 114 that utilizes machine learning approach to analyze and categorize malware. The computer 102 may learn to distinguish malware based on data points such as typical non-malicious software behavior, legitimate versus illegitimate data flow, and suspicious interactions or network traffic outside of the normal range of behavior. The computer 102 may determine a suspicion score that determines categorization as safe or malicious based on reaching a particular threshold. For example, if the suspicion score of a set of code satisfies a threshold, the computer may determine that the set of code is malicious; otherwise, the computer may determine that the set of code is safe. Certain traits of a file may have more weight in the calculation of suspicion score, based on how commonly the traits form the distinction between malicious code and safe code. The computer 102 may train the machine learning models based on an extensive amount of existing data, and continue to learn from new data as the computer 102 observes the host's influx of information without a need for connectivity to a database.

The computer 102 may perform intelligent learning through the training of neural network structures and use of deep learning on the properties of malware. Neural networks are highly suitable for many categorization tasks, and augmented by deep learning. The computer 102 may apply the neural networks to malware detection to achieve high detection accuracy for zero-day malware. In some embodiments, the computer 102 may train machine learning models using different artificial intelligence algorithms, including but are not limited to, neural networks, support vector machine (SVMs), decision trees, linear and logistic regression, clustering, association rules, and scorecards, to learn the patterns hidden in large volumes of training data.

In some embodiments, the computer 102 may train different machine learning models based on different data sources, including non-executable files, executable files, and network traffic. As a result, the computer 102 may comprise three different machine learning models: non-executable learning model 132, executable learning model 134, and network traffic learning model 136.

When the computer receives data files (also referred to as input files) from a network 108, the computer 102 may employ one or more machine learning models to detect malware. For example, when the received data files are potentially malicious non-executable files 120, the computer 102 may employ the non-executable learning model 132 to determine whether the received non-executable files are malicious. The computer 102 may apply static analysis to the non-executable files. The computer may analyze individual files with the machine learning model, either when the individual files are written or when they are accessed. In addition, the computer 102 may apply dynamic analysis to the non-executable files by using binary instrumentation

128. Binary instrumentation 128 is a method of analyzing the behavior of a binary application at runtime through the injection of instrumentation code. While the potentially malicious non-executable files 120 may not execute by itself, the non-executable files 120 may cause malicious actions to occur by influencing the actions of an otherwise non-malicious executable, such as host system .exes 126. By performing both static and dynamic analysis with the non-executable learning model 132, the computer 102 may detect the malware within the potential malicious non-executable files 120.

Similarly, when the computer 102 receives data files that are potentially malicious executable files 122, the computer 102 may employ the executable learning model 134 to determine whether the received executable files are malicious. The computer 102 may apply static analysis to the executable files 122. For static analysis, the computer may apply machine learning to the on-disk contents of executable files (e.g., when the file is written or when a new process is started). The computer may also apply machine learning to the contents of memory pages in order to discover memory-only malware and malware that uses polymorphism, packing, encryption, and other file obfuscation techniques. In addition, the computer 102 may apply dynamic analysis to the executable files 122 by using binary instrumentation 128. For dynamic analysis, the computer 102 may capture system call sequences (the sequence of the process's interaction with the operating system and the environment) from individual processes and apply machine learning, in real time or near real time, to the sequences.

The aforementioned description includes non-executable files 120 and executable files 122 for an ease of explanation. It should be understood that the non-executable files 120 may be non-executable portions of a plurality of computer programs and the executable files 122 may be executable portions of the plurality of computer programs. A single computer program may therefore contain executable portions and non-executable portions. The computer may train the non-executable learning model 132 based on the non-executable portions and the executable learning model 134 based on the executable portions.

When the computer 102 receives potentially malicious network traffic 124, the computer may employ the network traffic learning model 136 to determine whether the received network traffic 124 is malicious. Only dynamic analysis applies to the network traffic. The computer 102 may use a network packet capture filter 130 to transparently capture packet sequences from the network interface. The computer 102 may also use the processing capabilities available in existing tools to distill packet sequences into higher-level information in order to make features included in the higher-level information available to network traffic machine learning model 136.

After the computer 102 employs the various machine learning models to identify malware, the computer 102 may protect itself from compromise by performing corruption detection and correction 116. The computer 102 may restore to a clean, uncorrupted state to correct unauthorized manipulation caused by the malware.

The computer 102 may develop the signature-less anti-malware application (AMISS) 118 by identifying malware in machine learning system 114, and restoring to a clean state in corruption detection and correction 116 to prevent damage on the computer caused by the malware. The computer 102 may integrate with endpoint protection software, such as host based security system (HBSS) 106 to better protect the security of the computer 102.

In addition, the computer 102 may report security relevant events (e.g., detected malware) to SIEM system 104 via the network 108. For example, the computer 102 may transmit a detection alert message comprising the detected malware to the SIEM system 104 via the network 108. By reporting the malicious activity of malware to SIEM systems 104, the computer 102 may inform the whole network of potential threats, and protect the whole network. Examples of the network 108 include, but are not limited to, Local Area Network (LAN), Wireless Local Area Network (WLAN), metropolitan Area Network (MAN), Wide Area Network (WAN), and the Internet. The communication over the network 108 may be performed in accordance with various communication protocols, such as Transmission Control Protocol and Internet Protocol (TCP/IP), User Datagram Protocol (UDP), and IEEE communication protocols.

Furthermore, the computer 102 may interact with an administrative system 112 via an isolated control network 110 to enable the system administrator to act on the attempted breach by further processing the malware and correcting corruptions caused by the malware. By receiving administrative operation via the isolated control network 110, the computer 102 may make sure that the malware may not be able to spread to other devices and cause further damages in other devices.

Figure 2:
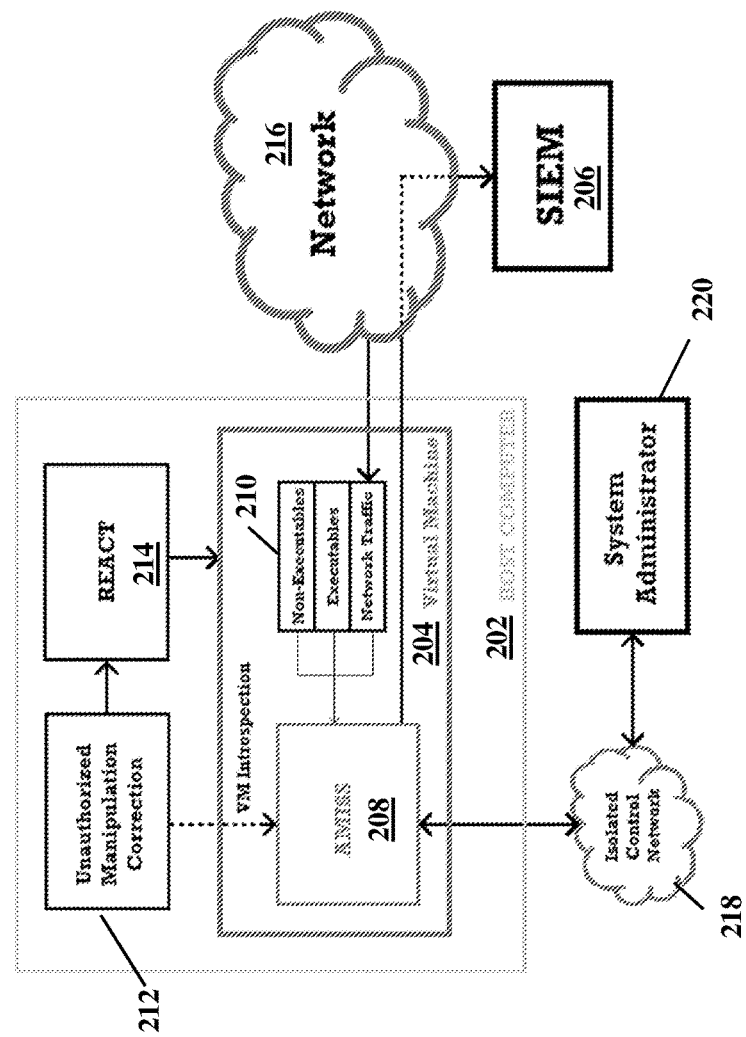
FIG. 2 illustrates virtual machine structure of the computer for signature-less real-time anti-malware detection and protection, according to an embodiment.

FIG. 2 illustrates virtual machine structure of the computer 200 for signature-less real-time anti-malware detection and protection, according to an embodiment. The computer 202 running a signature-less anti-malware application 208 may protect both the host computer and the software of anti-malware application 208 from corruption. In order to protect the host computer 202 and the anti-malware application 208 from infection, the computer may employ virtualized environments with a hypervisor, which may enable the software to protect safe, uncorrupted states outside of the realm of potential malicious program's abilities to access.

The computer 202 may implement virtual machine 204 for the most secure protection of the host and the anti-malware system. The hypervisor-virtual machine structure 204 may allow complete separation from the operating area of the endpoint system (e.g., the computer 202), and, consequently, potential malicious code, and the system that protects it. The hypervisor-virtual machine structure 204 may prevent corruption of the software by malicious entities, and allow restoration of guaranteed clean, uninfected states of the endpoint system (e.g., the computer 202). Within the virtual machine 204, the antimalware logic of anti-malware application 208 may apply various machine learning models to data files 210 from the network 216 to detect malware. The data files 210 may include the non-executable files, executable files, and the network traffic.

The computer 202 may use REACT (Resilient Ephemeral Architecture) 214 technology and virtual machine introspection to detect attempts to subvert the anti-malware application 208 and to provide rapid system restoration in the event of compromise. REACT 214 is a software platform that can transparently restore any protected system to a known-good state within seconds. REACT 214 is a configurable architecture for using disposable virtual machines (D-VMs) on servers and endpoints to provide fast system reconstitution and to improve system security and resilience. The virtual machine introspection may be a technique for monitoring the runtime state of a system-level virtual machine (VM), which is helpful for debugging or forensic analysis.

The computer 202 may report detected malware to STEM system 206. Specifically, the hypervisor virtual machine 204 may interact with the SIEM system 206 via the network 216 comprising the detected malware. The computer 202 may interact with an administrative system 220 via an isolated control network 218 to enable the system administrator to act on the attempted breach and correct the corruptions caused by the malware.

The computer 202 may be able to store states of the endpoint machine that are known to be clean. The endpoint (e.g., computer) may be able to interact with a copied version of the saved clean state, which may be discarded if it becomes contaminated, allowing restore of the pristine state. The computer 202 may detect, protect from, and process malware on a scale that has not been accomplished by conventional anti-malware programs, with the ability to learn distinctions rather than hard code facts and act outside of malware's ability to affect the software, crafting a safer and more secure working environment for users working with sensitive and high-security information.

FIG. 3 illustrates a flowchart for signature-less real-time anti-malware detection and protection, according to an embodiment. Other embodiments may comprise additional or alternative steps, or may omit some steps altogether.

At step 302, the computer may develop and train a first machine learning model for detecting malicious code (e.g., malware) targeting executable portions of computer programs and running processes. The machine learning model may learn different properties of malware based on a training dataset of executable portions of computer programs. The computer may train the model using a corpus of executable portions, both malicious and clean (e.g., non-malicious).

The computer may detect malware in executable portions and running processes. The computer may employ both static analysis of executable portions and dynamic analysis of running processes using binary instrumentation in order to detect malware. Binary instrumentation is a method of analyzing the behavior of a binary application at runtime through the injection of instrumentation code. This instrumentation code executes as part of the normal instruction stream after being injected. In most cases, the instrumentation code will be entirely transparent to the application that it is been injected to. Analyzing an application at runtime makes it possible to gain insight into the behavior and state of an application at various points in execution.

For static analysis, the computer may apply machine learning to the on-disk contents of executable portion (e.g., when the portion is written or when a new process is started). The computer may also apply machine learning to the contents of memory pages in order to discover memory-only malware and malware that uses polymorphism, packing, encryption, and other file obfuscation techniques. For dynamic analysis, the computer may capture system call sequences (the sequence of the process's interaction with the operating system and the environment) from individual processes and apply machine learning, in real time or near real time, to the sequences.

The computer may make use of existing public machine-learning libraries, such as Apache Spark MLlib, Google TensorFlow, and Caffe. These libraries allow for convenient testing of different learning algorithms. The computer may use several libraries including deep learning tools. The primary focus of both types of libraries is Python and Java development.

In addition to the neural networks, the computer may use SVMs. SVMs are a supervised learning model and are particularly good at avoiding overfitting of data. As discussed above, the computer may use different artificial intelligence algorithms, including but are not limited to, neural networks, SVMs, decision trees, linear and logistic regression, clustering, association rules, and scorecards, to learn the patterns hidden in large volumes of training data. The computer may also use random forests, an ensemble learning method that has a particular talent for categorization, to categorize between malicious code and clean code.

The computer may gather malicious and clean (non-malicious) files and/or portions for analysis from publicly-available online databases, such as Contagio, theZoo, and data from DARPA Intrusion Detection Evaluations.

At step 304, the computer may develop and train a second machine learning model for detecting malicious code (e.g., malware) targeting non-executable portions of the computer programs. The machine learning model may learn different properties of malware based on a training dataset of non-executable portions, both malicious and non-malicious.

The computer may detect malicious non-executable portions. The computer may apply static analysis to non-executable files and apply dynamic analysis using binary instrumentation techniques to processes accessing non-executable portions in order to detect malicious portions.

For static analysis, the computer may perform the static analysis with a machine learning model in the same way as discussed in step 302. The computer may analyze individual portions with the machine learning model, either when the individual portions are written or when they are accessed.

Dynamic analysis for non-executable portion, while potentially very valuable for identifying malicious data files, may be more challenging than analyzing executables, because the malicious entity (the data file) never "executes" by itself. Rather, the malicious data file causes malicious actions to occur by influencing the actions of an otherwise non-malicious executable, generally as a result of the executable reading and interpreting the file. The most common kinds of malicious data files may be files that exploit a vulnerability, such as an image file that causes a buffer overflow, and files that contain malicious scripts, such as Microsoft Office files and Adobe PDFs. The executables (e.g., Microsoft Word) may not be malicious by itself, but the computer may detect files that would cause the executables to behave maliciously. In order to perform dynamic analysis of non-executable files, the computer may apply the same dynamic instrumentation as in step 302 to the software that is accessing the potentially malicious file.

At step 306, the computer may develop and train a third machine learning model for detecting malicious code (e.g., malware) targeting network traffic. The machine learning model may learn different properties of malware based on a training dataset of network traffic, both malicious and non-malicious.

The computer may detect malicious network traffics. The computer may dynamically analyze network traffic using host-based packet capture filters to find malicious network traffic and network traffic produced by malware.

The primary difference with network traffic analysis is that there is no "static" network traffic. Only dynamic analysis applies to the network traffic. The method for acquiring information for dynamic analysis may be different than previous steps of 302, 304. Instead of dynamic software instrumentation to acquire system calls, the computer may use a network packet capture filter to transparently capture packet sequences from the network interface. The computer may use publicly-available network capture tools, such as WinPcap, libpcap, and tcpdump. The computer may also use the processing capabilities available in tcpdump and Wireshark (tshark) to distill packet sequences into higher-level information in order to make these features available to machine learning algorithms.

To develop and train the machine learning component, the computer may analyze "offline" network traffic data (e.g., packet capture files). The computer may enhance the software to apply the detection models to real-time network traffic analysis. The results from the analysis of offline data may inform the reality of how quickly packets can be processed by the learning algorithm and what degree of real-time analysis can be realistically achieved.

At step 308, the computer may identify malware within an input file (e.g., a data file) using the various machine learning models. The computer may employ artificial intelligence techniques to autonomously learn properties of malware without relying on malware signatures. The computer may use machine learning techniques with multiple different learning models to identify malware. Specifically, the computer may identify malicious behaviors based on the machine learning models trained for three data files: executable files, non-executable files, and network traffic. In some embodiments, the malicious behaviors of the three data files may be relevant. For example, the malicious executable may have a pattern of network traffic associated with it. The computer may collectively employ different machine learning models on the multiple sources of the data streams. The different machine learning models may learn the shared features of a large and diverse data set, and identify the malware by detecting features that deviate highly from the shared features.

The computer may determine a suspicion score for a data file (e.g., a set of code). In some embodiments, the computer may consider different traits when calculating the suspicion score. The computer may assign a weight value for each trait. Certain traits of a file may have more weight in the calculation of suspicion score, based on how commonly the traits form the distinction between malicious code and safe code. If the suspicion score of the data file satisfies a threshold, the computer may determine that the data file comprises malicious code; otherwise, the computer may determine that the data file is safe. The computer may also determine the trade-off of a higher false positive rate for a higher detection rate, and a lower false positive rate, but a lower detection rate.

The computer may analyze the results of various learning models to categorize the difference between malicious and clean activity. Based on the effectiveness of the methods, the computer may further refine the methodology of each model.

One method to check the effectiveness of the system in detecting zero-day viruses may be through use of non-current training set. Available data sets of files that are not continuously updated will exclude recent zero-day exploits, which may be used in test cases to see whether or not the system is able to determine that they are in fact malware. Another option may be the modification of training sets. If the computer parses out all malware in a training set that makes use of a particular type of vulnerability, the computer may form "zero-day," in which the system has no data from the particular exploit used and on which the computer is able to test against. Given the sequential development of related malware that is created after the release of a new exploit, the computer may be able to analyze whether malware that takes advantage of particular newly exploited vulnerabilities is able to be detected if it has been seen, but only once or rarely. The computer may be able to inspect how detection rates of sequential, related malware is affected by the introduction of fist-wave zero-day malware of that same type into the knowledge set, catching subsequent attacks on the system.

The computer may perform detection locally, without the need for network connectivity. The computer may perform the detection of malware locally and autonomously, without network connectivity or user input. The computer may continuously and autonomously learn from new data as the computer observes the host's influx of information.

At step 310, the computer may restore to a clean, uncorrupted state that is not compromised by the malware. The computer may protect itself and the anti-malware application software from being subverted or compromised. The computer may use virtualization-based cyber defense technologies to separate anti-malware application and the endpoint environment, to detect and prevent compromise of the anti-malware application, and to restore anti-malware application and the endpoint (e.g., computer) to an uncompromised state.

In other words, the computer may use virtual machine technology to restore to a clean slate. For example, the computer may use virtual machine introspection (VMI). The VMI is a technique for monitoring the runtime state of a system-level VM, which is helpful for debugging or forensic analysis. In operation, the computer may put all of the antimalware logic inside the virtual machine and the part outside the virtual machine is virtual machine introspection to make sure that the antimalware system is not been manipulated. The computer may do integrity checking on the antimalware. By putting the expensive antimalware logic inside the virtual machine where it is more convenient, the computer may perform malware detection relatively cheap.

At step 312, the computer may report the detected malware to a security server (e.g., SIEM systems) by transmitting a detection alert message. The computer may provide configurable reporting to and integration with SIEM systems, ensuring that security relevant events, such as detection of malicious activity, are reported to the SIEM in near real time. By reporting the malicious activity to SIEM systems, the computer may inform the whole network of potential threats, and protect the whole network.

The computer may support an out-of-band control connection. The computer may support remote administration and communication over a separate, secure network (e.g., isolated control network). The computer may interact with an administrative system via an isolated control network to enable the system administrator to act on the attempted breach and correct the corruptions caused by the malware. By receiving administrative operation via the isolated control network, the computer may make sure that malware may not be able to spread to other devices and cause further damages in other devices.

The foregoing method descriptions and the process flow diagrams are provided merely as illustrative examples and are not intended to require or imply that the steps of the various embodiments must be performed in the order presented. The steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, and the like. When a process corresponds to a function, the process termination may correspond to a return of the function to a calling function or a main function.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of this disclosure or the claims.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the claimed features or this disclosure. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the embodiments described herein and variations thereof. Various modifications to these embodiments will be readily apparent to those skilled in the art, and the generic principles defined herein may be applied to other embodiments without departing from the spirit or scope of the subject matter disclosed herein. Thus, the present disclosure is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A computer implemented method comprising:
   training, by a computer, a first machine learning model for detecting malicious inputs based on a dataset of executable portions of a plurality of computer program files by applying static analysis and dynamic analysis using binary instrumentation techniques, wherein the binary instrumentation techniques comprise analyzing behavior of the plurality of computer program files at runtime through injection of an instrumentation code, wherein the static analysis includes analyzing at least one of: on-disk contents and contents of memory pages, and wherein the dynamic analysis comprises analyzing call sequences;
   training, by the computer, a second machine learning model for detecting malicious inputs based on a dataset of non-executable portions of the plurality of computer program files by applying the static analysis and the dynamic analysis using the binary instrumentation techniques; and
   identifying, by the computer, a malicious portion within an input file using the first and second machine learning models.

2. The method of claim 1, further comprising:
   determining, by the computer, a suspicion score for the input file; and
   upon the computer determining that the suspicion score satisfies a threshold, indicating, by the computer, that the input file includes the malicious portion.

3. The method of claim 1, further comprising:
   training, by the computer, a third machine learning model detecting malicious code based on a dataset of network traffic by applying the dynamic analysis using a network packet capture filter.

4. The method of claim 3, further comprising:
   training, by the computer, the first, second and third machine learning models using artificial intelligence algorithms comprising neural networks, support vector machine (SVMs), decision trees, linear and logistic regression, clustering, association rules, and scorecards.

5. The method of claim 1, further comprising:
   restoring, by the computer, to a clean state that is not compromised by the malicious portion; and
   transmitting, by the computer, an alert message comprising the detected malicious portion to a security server.

6. The method of claim 5, further comprising:
   implementing, by the computer, virtual machine structure to allow restoration to the clean state.

7. The method of claim 1, further comprising:
monitoring, by the computer, malicious behaviors using virtual machine introspection.

8. The method of claim 1, further comprising:
categorizing, by the computer, the malicious portion and a clean portion using random forests algorithm.

9. The method of claim 1, further comprising:
receiving, by the computer, an administrative operation to correct corruptions via an isolated control network.

10. A system comprising:
a security server,
a computer in communication with the security server and configured to:
train a first machine learning model for detecting malicious inputs based on a dataset of executable portions of a plurality of computer program files by applying static analysis and dynamic analysis using binary instrumentation techniques, wherein the binary instrumentation techniques comprise analyzing behavior of the plurality of computer program files at runtime through injection of an instrumentation code, wherein the static analysis includes analyzing at least one of: on-disk contents and contents of memory pages, and wherein the dynamic analysis comprises analyzing call sequences;
train a second machine learning model for detecting malicious inputs based on a dataset of non-executable portions of the plurality of computer program files by applying the static analysis and the dynamic analysis using the binary instrumentation techniques; and
identify a malicious portion within an input file using the first and second machine learning models.

11. The system of claim 10, wherein the computer is further configured to:
determine a suspicion score for the input file; and
upon the computer determining that the suspicion score satisfies a threshold, indicate that the input file includes the malicious portion.

12. The system of claim 10, wherein the computer is further configured to:
train a third machine learning model detecting malicious code based on a dataset of network traffic by applying the dynamic analysis using a network packet capture filter.

13. The system of claim 12, wherein the computer is further configured to:
train the first, second and third machine learning models using artificial intelligence algorithms comprising neural networks, support vector machine (SVMs), decision trees, linear and logistic regression, clustering, association rules, and scorecards.

14. The system of claim 10, wherein the computer is further configured to:
restore to a clean state that is not compromised by the malicious portion; and
transmit an alert message comprising the detected malicious portion to a security server.

15. The system of claim 14, wherein the computer is further configured to:
implement virtual machine structure to allow restoration to the clean state.

16. The system of claim 10, wherein the computer is further configured to:
monitoring, by the computer, malicious behaviors using virtual machine introspection.

17. The system of claim 10, wherein the computer is further configured to:
categorize the malicious portion and a clean portion using random forests algorithm.

18. The system of claim 10, wherein the computer is further configured to:
receive an administrative operation to correct corruptions via an isolated control network.

* * * * *